(12) United States Patent
Gielisch et al.

(10) Patent No.: US 9,409,457 B2
(45) Date of Patent: Aug. 9, 2016

(54) INDEPENDENT SUSPENSION OF A WHEEL OF A TWO-TRACK VEHICLE WITH A SCISSOR-TYPE ARM AND A SPRING ELEMENT

(71) Applicant: Bayerische Motoren Werke Aktiengesellschaft, Munich (DE)

(72) Inventors: Sebastian Gielisch, Unterschleissheim (DE); Martin Ladstaetter, Bergkirchen (DE); Alfred Pruckner, Munich (DE); Dirk Schlichte, Munich (DE); Roland Koenig, Habach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/666,442

(22) Filed: Mar. 24, 2015

(65) Prior Publication Data

US 2015/0191064 A1    Jul. 9, 2015

Related U.S. Application Data

(63) Continuation of application No. PCT/EP2013/066225, filed on Aug. 1, 2013.

(30) Foreign Application Priority Data

Sep. 25, 2012   (DE) .......................... 10 2012 217 271

(51) Int. Cl.
*B60G 3/20*     (2006.01)
*B60G 3/14*     (2006.01)
(Continued)

(52) U.S. Cl.
CPC *B60G 3/20* (2013.01); *B60G 3/145* (2013.01); *B60G 3/185* (2013.01); *B60G 3/22* (2013.01);
(Continued)

(58) Field of Classification Search
CPC ............ B60G 3/20; B60G 15/06; B60G 7/00; B60G 3/145; B60G 3/185; B60G 11/14; B60G 3/22; B60G 2200/14; B60G 2200/46; B60G 2200/446; B60G 2202/30; B60G 2204/414; B60G 2200/13; B60G 2204/421; B60G 2204/30
See application file for complete search history.

(56) References Cited

U.S. PATENT DOCUMENTS 4,087,115 A * 5/1978 Earle .......................... B60G 3/12
                                                    267/221
5,620,173 A    4/1997 Yang
(Continued)

FOREIGN PATENT DOCUMENTS

DE              42 03 057 A1    8/1993
DE       10 2010 029 032 A1    11/2011
(Continued)

OTHER PUBLICATIONS

International Search Report (PCT/ISA/210) dated Feb. 4, 2014 with English translation (seven pages).
(Continued)

*Primary Examiner* — Drew Brown
(74) *Attorney, Agent, or Firm* — Crowell & Moring LLP

(57) ABSTRACT

An independent suspension of a wheel of a two-track vehicle includes a trailing arm, one of the end portions of which is hinged to a vehicle body of the vehicle and the other end portion of which supports a wheel carrier. A scissor-type arm is hinged to the trailing arm and guides the trailing arm relative to the vehicle body. A spring element supports the trailing arm relative to the vehicle body. The spring element is arranged on the trailing arm in the region of the hinge point of the scissor-type arm to the trailing arm when seen in the direction of the vehicle longitudinal axis.

15 Claims, 16 Drawing Sheets

(51) Int. Cl.
*B60G 3/18* (2006.01)
*B60G 3/22* (2006.01)
*B60G 11/14* (2006.01)
*B60G 7/00* (2006.01)
*B60G 15/06* (2006.01)

(52) U.S. Cl.
CPC  *B60G 7/00* (2013.01); *B60G 11/14* (2013.01); *B60G 15/06* (2013.01); *B60G 2200/13* (2013.01); *B60G 2200/14* (2013.01); *B60G 2200/18* (2013.01); *B60G 2200/30* (2013.01); *B60G 2200/446* (2013.01); *B60G 2200/46* (2013.01); *B60G 2202/30* (2013.01); *B60G 2204/148* (2013.01); *B60G 2204/30* (2013.01); *B60G 2204/414* (2013.01); *B60G 2204/421* (2013.01); *B60G 2204/422* (2013.01)

(56) References Cited

U.S. PATENT DOCUMENTS

| | | | |
|---|---|---|---|
| 6,045,317 A | | 4/2000 | Boucher et al. |
| 2005/0082105 A1* | | 4/2005 | Epple .................... B60G 3/145 180/361 |
| 2006/0186616 A1* | | 8/2006 | Rudiger .................... B60G 3/14 280/6.15 |
| 2006/0283653 A1* | | 12/2006 | Buschena .............. B60G 3/145 180/340 |
| 2008/0079233 A1* | | 4/2008 | Gerrard .................... B60G 3/20 280/124.109 |
| 2008/0185807 A1 | | 8/2008 | Takenaka |
| 2012/0068431 A1* | | 3/2012 | Jakob .................... B60G 3/145 280/124.128 |
| 2012/0292874 A1 | | 11/2012 | Davy et al. |
| 2014/0353937 A1* | | 12/2014 | Girelli Consolaro .......... B60G 21/0551 280/124.128 |

FOREIGN PATENT DOCUMENTS

| | | |
|---|---|---|
| EP | 0 001 344 A1 | 4/1979 |
| EP | 0 754 575 A2 | 1/1997 |
| FR | 846 448 A | 9/1939 |
| WO | WO 2011/072967 A1 | 6/2011 |

OTHER PUBLICATIONS

German Search Report dated Jul. 31, 2013 with partial English translation (10 pages).

* cited by examiner

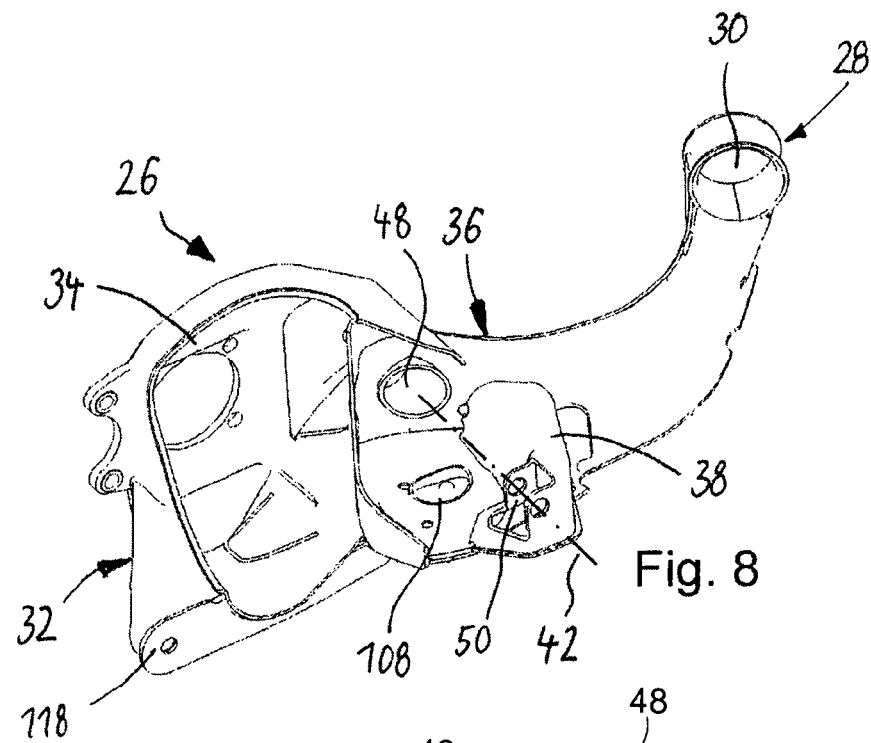
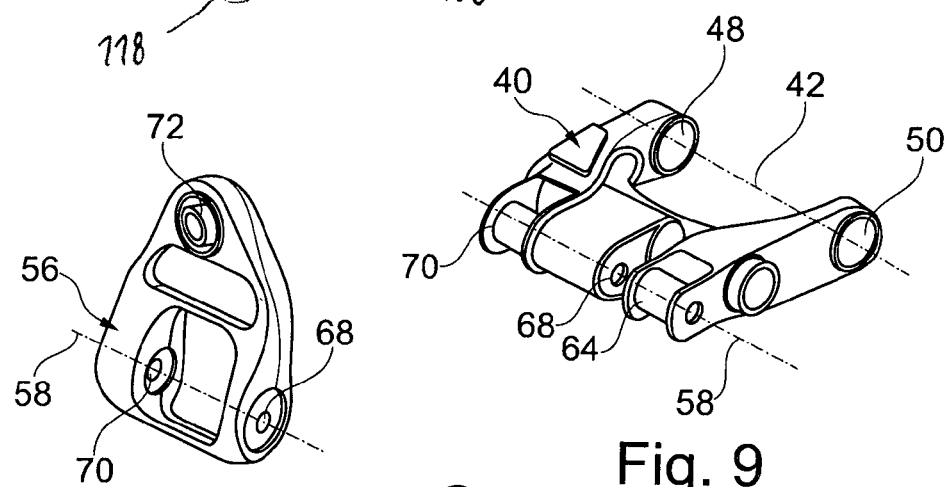
Fig. 8
Fig. 9
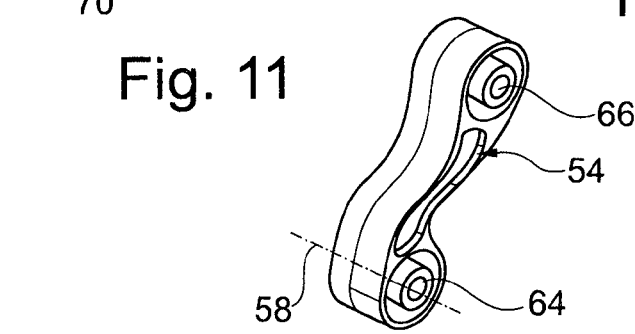
Fig. 11
Fig. 10

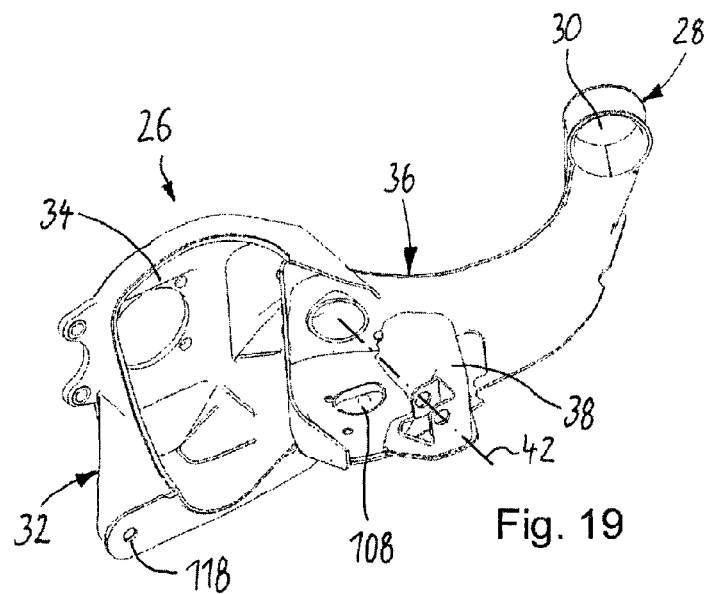
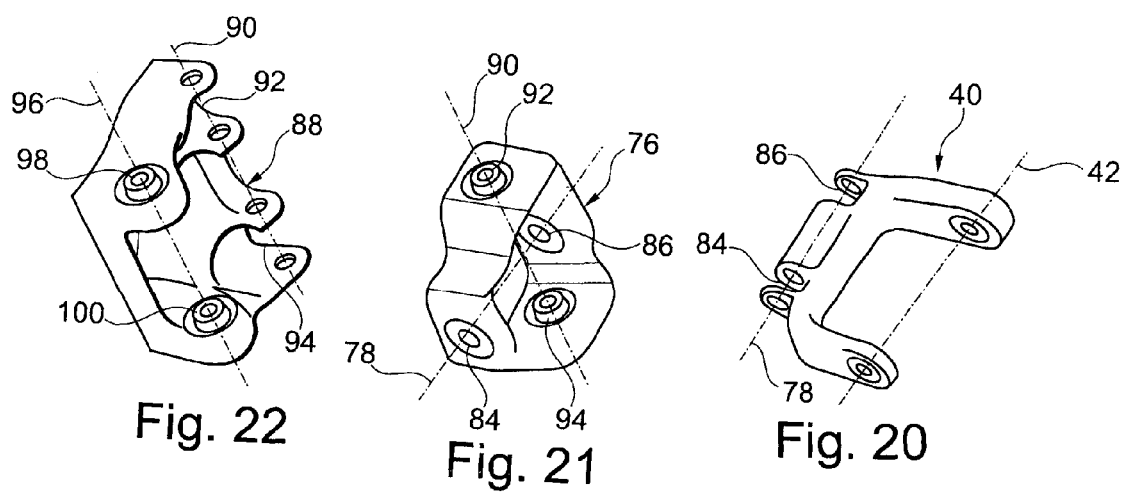

INDEPENDENT SUSPENSION OF A WHEEL OF A TWO-TRACK VEHICLE WITH A SCISSOR-TYPE ARM AND A SPRING ELEMENT

CROSS REFERENCE TO RELATED APPLICATIONS

This application is a continuation of PCT International Application No. PCT/EP2013/066225, filed Aug. 1, 2013, which claims priority under 35 U.S.C. §119 from German Patent Application No. 10 2012 217 271.8, filed Sep. 25, 2012, the entire disclosures of which are herein expressly incorporated by reference.

BACKGROUND AND SUMMARY OF THE INVENTION

The invention relates to an independent suspension of a wheel of a two-track vehicle. Such an independent suspension is disclosed, for example, in WO 2011/072967 and U.S. Pat. No. 5,620,173.

Independent suspensions of the inventive type are used especially for the rear axles of automobiles. In the case of such rear axles, the wheels are normally not steerable and, as is correspondingly known, have a great influence on the driving stability and driving safety of the vehicle. In order to attain stable driving handling in the greatest possible number of driving situations, modern rear axles are kinematically designed such that they generate a negative camber angle via the spring compression travel. The negative camber angle maximizes the transferable lateral forces relative to the vehicle structure or vehicle body. In addition, a toe-in angle at the wheel is desired in terms of the kinematic effects via the spring compression travel of the wheel relative to the vehicle body and in terms of the elastokinematic effects via the longitudinal forces acting on the wheel (in particular during deceleration) in order to generate understeering handling of the vehicle and to prevent the rear from suddenly breaking away when there is a change in the load. Today there are relatively complex axle designs for such handling, for instance in the form of five link axles or semi-trailing arm axles. However, in addition to high costs, these axle designs also suffer from the drawback that they require a lot of installation space. In contrast, torsion beam rear axles, which are also known, are somewhat less expensive but have certain drawbacks with respect to driving dynamics.

Known from WO 2011/072967 is an independent suspension of a non-steerable wheel of a two-track vehicle in which a trailing arm supports, on its rear end with respect to the direction of travel, an associated wheel. The trailing arm is furthermore hinged at its front end area to the vehicle structure by way of a pendulum link, and in its center area to the vehicle structure by way of a scissors-type arm.

The aforesaid U.S. Pat. No. 5,620,173 describes an independent suspension in the form of a so-called double-acting distributed pressure vibration-proof structure, which may apparently be provided between the structure and the axis of a vehicle.

The object of the invention is to provide an independent suspension that requires an especially small installation space and yet leads to precise wheel guidance at the required angles in order to attain, in particular, stable driving handling over the greatest possible number of driving situations.

This and other objects are achieved in accordance with the invention by an independent suspension of a wheel of a two-track vehicle having a trailing arm that at one end area is hinged to a body of the vehicle and at its other end area supports a wheel carrier. A scissors-type arm is hinged to the trailing arm and guides the trailing arm relative to the vehicle body. A spring element supports the trailing arm relative to the vehicle body, wherein the spring element is arranged on the trailing arm in the region of the hinge point of the scissors-type arm to the trailing arm when viewed in the direction of the vehicle longitudinal axis.

The scissors-type arm is hinged to the trailing arm inside the wheel rim in a lateral projection of the wheel rim. In one particularly advantageous refinement, the scissors-type arm may be arranged overall inside the wheel rim or in this rim interior space in a lateral projection (but only when seen from a lateral projection).

The hinging of a scissors-type arm to a trailing arm of an independent suspension makes optimum use of the space available on the associated wheel. The hinging is embodied such that it is disposed in a hollow space formed by the rim or in the immediate lateral projection of said hollow space. Thus the scissors-type arm may also be arranged in this area, so that it fits into the available installation space particularly advantageously. The result is an especially compact manner of construction combined with short lever lengths and low transverse force effects. Moreover, the manner of construction has a positive effect on the vehicle body and especially permits a particularly low volume for the wheel house here.

Such a design of the scissors-type arm overall provides a compact construction that nevertheless permits sufficient excursion of the trailing arm. Furthermore, this design leads to advantageous support of the trailing arm, wherein in particular low bending forces act thereon. Guidance by way of the scissors-type arm and the support force are concentrated on a single force introduction area on the trailing arm.

The aforesaid spring element may be a coil spring. The coil spring makes it possible to have a spring element that is limited to a comparatively small and essentially cubic volume. The spring element may be arranged overall inside the rim in a lateral projection thereof. Such a design creates overall a compact manner of construction that nevertheless permits precise guidance and simultaneously sufficient excursion and resilient support of the trailing arm.

In the independent suspension in accordance with the invention, a damper that supports the trailing arm relative to the vehicle body is also preferably provided and is arranged on the trailing arm in the area behind the scissors-type arm as seen in the direction of the vehicle longitudinal axis.

This type of arrangement of a damper supporting the trailing arm on the vehicle body also leads to a very compact manner of construction. It both enables a longitudinal movement path for the damper and permits the use of a particularly narrow damper body.

The slight mobility of the scissors-type arm in the direction of the vehicle longitudinal axis and, in particular, also the guidance of the trailing arm in the direction of the vehicle transverse axis, is preferably created with a pendulum support hinged to the vehicle body.

In this refinement, the scissors-type arm is guided by a pendulum support that itself is hinged to the vehicle body. The pendulum support extends in particular essentially vertically. It may swing in the direction of the vehicle longitudinal axis and thus permits the scissors-type arm to move slightly in the direction of the vehicle longitudinal axis. In this manner, as already mentioned in the foregoing, the scissors-type arm may compensate the offset that it experiences when the trailing arm is pivoted essentially about the vehicle transverse axis when the wheel compresses and rebounds.

When the associated wheel compresses and rebounds due to the centrally acting weight of the vehicle body and the contact surface of the wheel, which is laterally offset relative thereto, the trailing arm of the inventive independent suspension would travel outward in the direction of the vehicle transverse axis and would possibly rotate about the vehicle longitudinal axis. Guidance that counters this otherwise occurring movement of the trailing arm may be advantageously provided with a pendulum support that is hinged on one hand to the vehicle body and on the other hand to the scissors-type arm. The scissors-type arm is then itself hinged to the trailing arm. The pendulum support may advantageously be designed with two pendulum arms, of which one may be designed in the shape of a triangle and, with its three pivot points, may thus also absorb a torque transverse to the pendulum movement.

Alternatively, the slight mobility of the scissors-type arm in the direction of the vehicle longitudinal axis and in particular also the guidance of the trailing arm in the direction of the vehicle transverse axis is created with a cardanic support hinged to the vehicle structure.

A cardanic support or suspension is a device for rotatably bearing an article in two axes that are essentially at right angles to one another. The inventively used cardanic support represents a very compact design for the independent suspension. It permits the hinging of the scissors-type arm to be slightly displaced in the direction of the vehicle longitudinal axis. At the same time, it supports a torque of the trailing arm about the vehicle longitudinal axis. Thus, in particular, it prevents the trailing arm from twisting about its longitudinal axis. In addition, the cardanic support is preferably designed with two axes that are essentially perpendicular to one another and are oriented essentially transverse to the vehicle longitudinal axis. It is particularly preferred that the cardanic support is designed with a cardanic ring that is held with two arms that essentially extend in the vehicle transverse direction such that it is slightly displaceable in the vehicle longitudinal direction. The ring is essentially borne rotation-fast about the vehicle longitudinal axis. A transverse axis is disposed in the ring and the scissors-type arm is hinged thereto. The scissors-type arm is thus borne rotation-fast about the vehicle longitudinal axis and with it the trailing arm. Nevertheless, the scissors-type arm is slightly mobile in the vehicle longitudinal direction. In this manner the pivoting of the inventive trailing arm is very advantageously guided on the vehicle structure in the direction of the vehicle transverse axis and also in the direction of the vehicle vertical axis.

Guidance for the trailing arm in the direction of the vehicle transverse axis is preferably also created with the aforesaid cardanic support. To this end, it is particularly preferred that one of the two axes of the cardanic support is oriented essentially in the direction of the vehicle vertical axis. The scissors-type arm, and with it the trailing arm, is held laterally with this axis. Furthermore, preferably the other axis of the cardanic support is essentially oriented in the direction of the vehicle transverse axis. With this axis the scissors-type arm hinged thereto may pivot up and down and also thus guide the trailing arm.

In other words, the pendulum support or the cardanic support is preferably supported on the scissors-type arm by way of a pivot axis that extends essentially in the direction of the vehicle transverse axis. The angle of this pivot axis to the vehicle transverse axis is advantageously selected to be in the vehicle longitudinal axis/vehicle transverse axis plane in a range between $-10°$ (angle from the vehicle transverse axis to the rear) and $+6°$ (angle from the vehicle transverse axis forward), preferably between $-5°$ and $+1°$, particularly preferably between $-3°$ and $-1°$. Furthermore, the angle of this pivot axis to the vehicle transverse axis is preferably selected to be in the vehicle vertical axis/vehicle transverse axis plane in a range between $-15°$ (angle from the vehicle transverse axis downward) and $+15°$ (angle from the vehicle transverse axis upward), preferably between $-10°$ and $+10°$, particularly preferably between $-5°$ and $+5°$.

The pendulum support or the cardanic support is furthermore preferably arranged overall inside the rim in a lateral projection thereof.

Such a design creates overall a compact manner of construction that nevertheless permits precise guidance and simultaneously sufficient excursion of the trailing arm.

For guiding the trailing arm in the direction of the vehicle vertical axis, the scissors-type arm is advantageously hinged to a pivot axis that is on the trailing arm and that extends essentially in the direction of the vehicle transverse axis.

The pivot axis of the scissors-type arm, which pivot axis extends in the direction of the vehicle transverse axis, on the trailing arm absorbs the torque or tilt moment that acts essentially about the longitudinal axis of the trailing arm and that occurs when the trailing arm is loaded on the one hand by the contact force of the wheel and on the other hand by the weight of the vehicle. The angle of this pivot axis to the vehicle transverse axis is advantageously selected to be in the vehicle longitudinal axis/vehicle transverse axis plane in a range of between $-9°$ (angle from the vehicle transverse axis to the rear) and $+3°$ (angle from the vehicle transverse axis forward), preferably between $-6°$ and $0°$, particularly preferably between $-4°$ and $0°$. The angle of the pivot axis to the vehicle transverse axis is advantageously selected to be in the vehicle vertical axis/vehicle transverse axis plane in a range between $+3°$ (angle from the vehicle transverse axis downward) and $-2°$ (angle from the vehicle transverse axis upward), preferably between $+2°$ and $-1°$, particularly preferably between $+1°$ and $0°$.

For the angles, the vertices of the angles are each disposed on the inside of the vehicle and the angles are each open toward the outside of the vehicle.

The hinging of the trailing arm at the first end area to the vehicle structure is preferably created by use of an elastomer bearing that permits an elastokinematic relative movement.

Such an elastomer bearing permits a pivot movement by the trailing arm in the direction of the vehicle vertical axis and furthermore at least a slight degree of freedom in the direction of the vehicle transverse axis. In contrast, the trailing arm is held essentially stationary for its pivot movement up and down on the vehicle in the direction of the vehicle longitudinal axis.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 8 is a perspective elevation of a trailing arm of the independent suspension in accordance with FIG. 1;

FIG. 9 is a perspective elevation of a scissors-type arm of the independent suspension in accordance with FIG. 1;

FIG. 10 is a perspective elevation of a pendulum support of the independent suspension in accordance with FIG. 1;

FIG. 11 is a perspective elevation of a track link of the independent suspension in accordance with FIG. 1;

FIG. 19 is a perspective view of a trailing arm of the independent suspension in accordance with FIG. 12;

FIG. 20 is a perspective elevation of a scissors-type arm of the independent suspension in accordance with FIG. 12;

FIG. 21 is a perspective elevation of a cardanic ring of the independent suspension in accordance with FIG. 12; and, FIG. 22 is a perspective elevation of a cardanic brace of the independent suspension in accordance with FIG. 12.

DETAILED DESCRIPTION OF THE DRAWINGS

Figure 1:
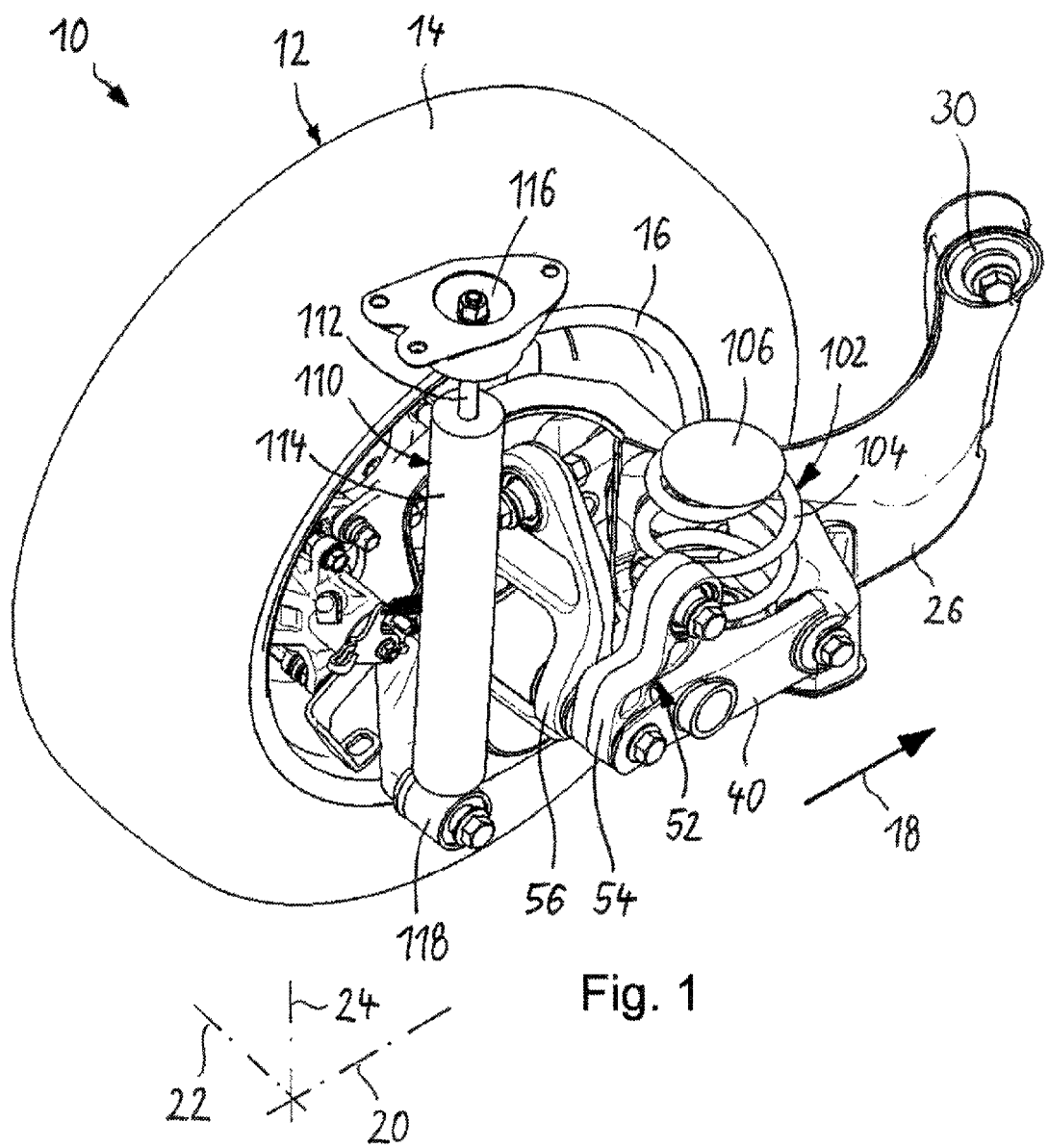
FIG. 1 is a first perspective elevation view of a first inventive independent suspension.
Figure 2:
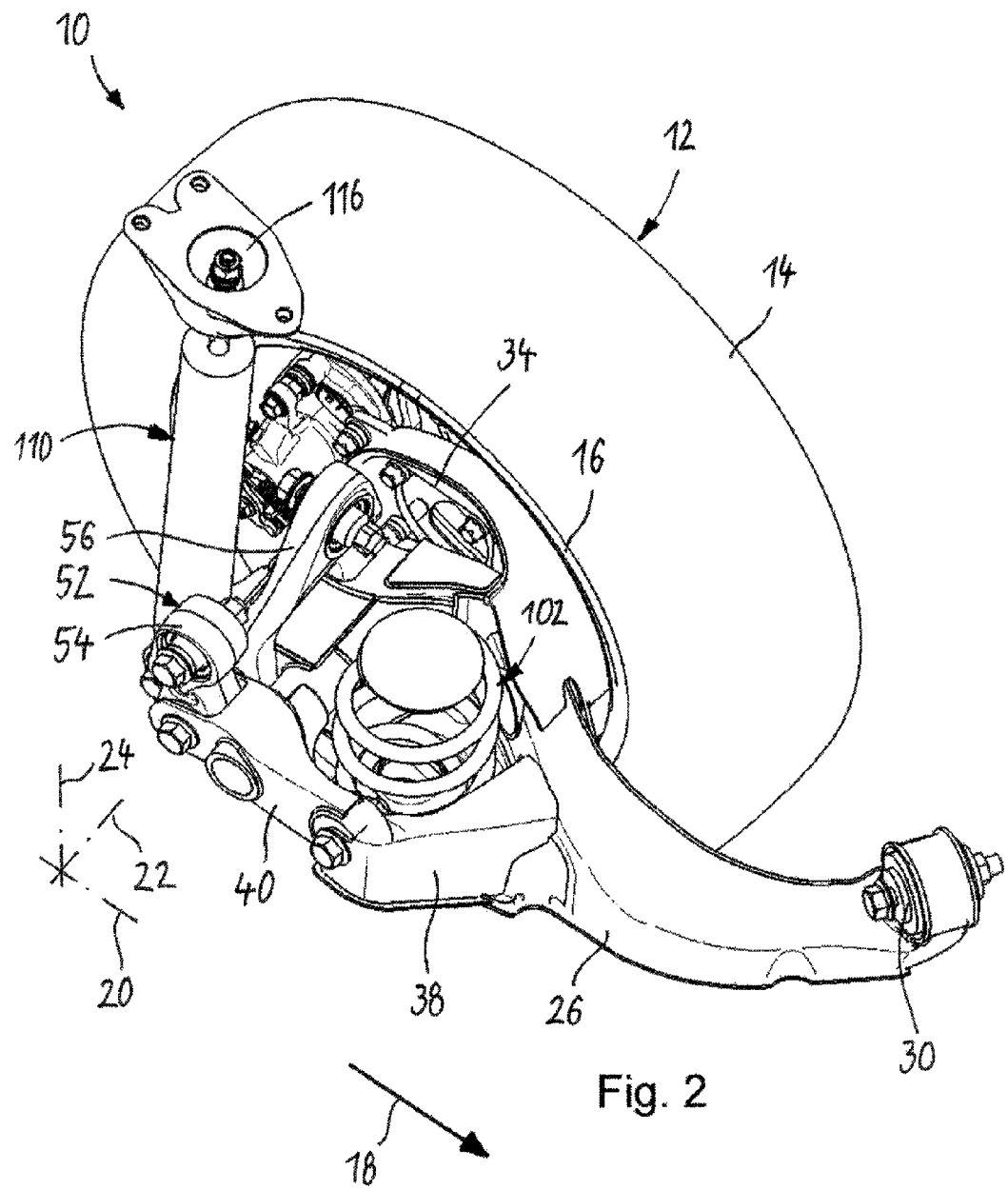
FIG. 2 is a second perspective elevation view of the independent suspension in accordance with FIG. 1.

The figures depict exemplary embodiments of an independent suspension 10 for a wheel 12 of an automobile (not shown in greater detail). The wheel 12 includes a tire 14 that is mounted on a rim 16. The automobile has a vehicle structure or a body (not shown), moves in a primary direction of travel 18 indicated with an arrow, and extends along a vehicle longitudinal axis 20, a vehicle transverse axis 22, and a vehicle vertical axis 24.

The independent suspension 10 is designed with a trailing arm 26 (see especially FIGS. 8 and 19) that is configured essentially in a rod or pan shape and has a front end area 28 in the primary direction of travel. Disposed on the front end area 28 is a bearing 30 that is designed as an elastomer bearing and with which the trailing arm 26 is pivotably born on the associated vehicle body structure. The elastomer bearing permits an elastokinematic pivot movement of the trailing arm 26, especially in the direction of the vehicle vertical axis 24, and furthermore permits at least a slight degree of freedom in the direction of the vehicle transverse axis 22. The trailing arm 26 is held essentially stationary for its pivot movement on the vehicle structure in the direction of the vehicle longitudinal axis 20.

Embodied on an associated rear end area 32 of the trailing arm 26 is a wheel carrier 34 with which the wheel 12 is borne rotatable about a wheel axis (not shown) that extends essentially parallel to the vehicle transverse axis 22. A side arm 38 is disposed at, and laterally offset from, a center area 36, lying between the front end area 28 and the rear end area 32, of the trailing arm 26, which may also be considered the primary arm of the trailing arm 26.

Figure 4:
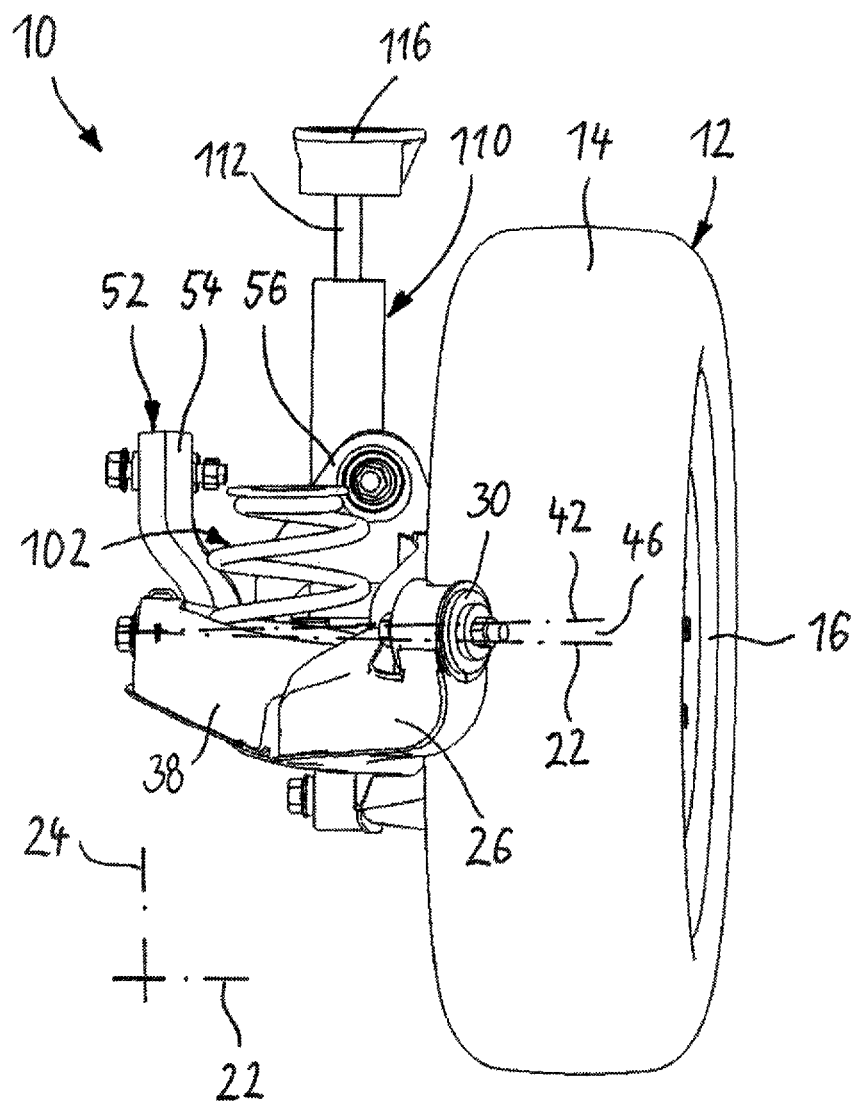
FIG. 4 is a front view of the independent suspension in accordance with FIG. 1.
Figure 5:
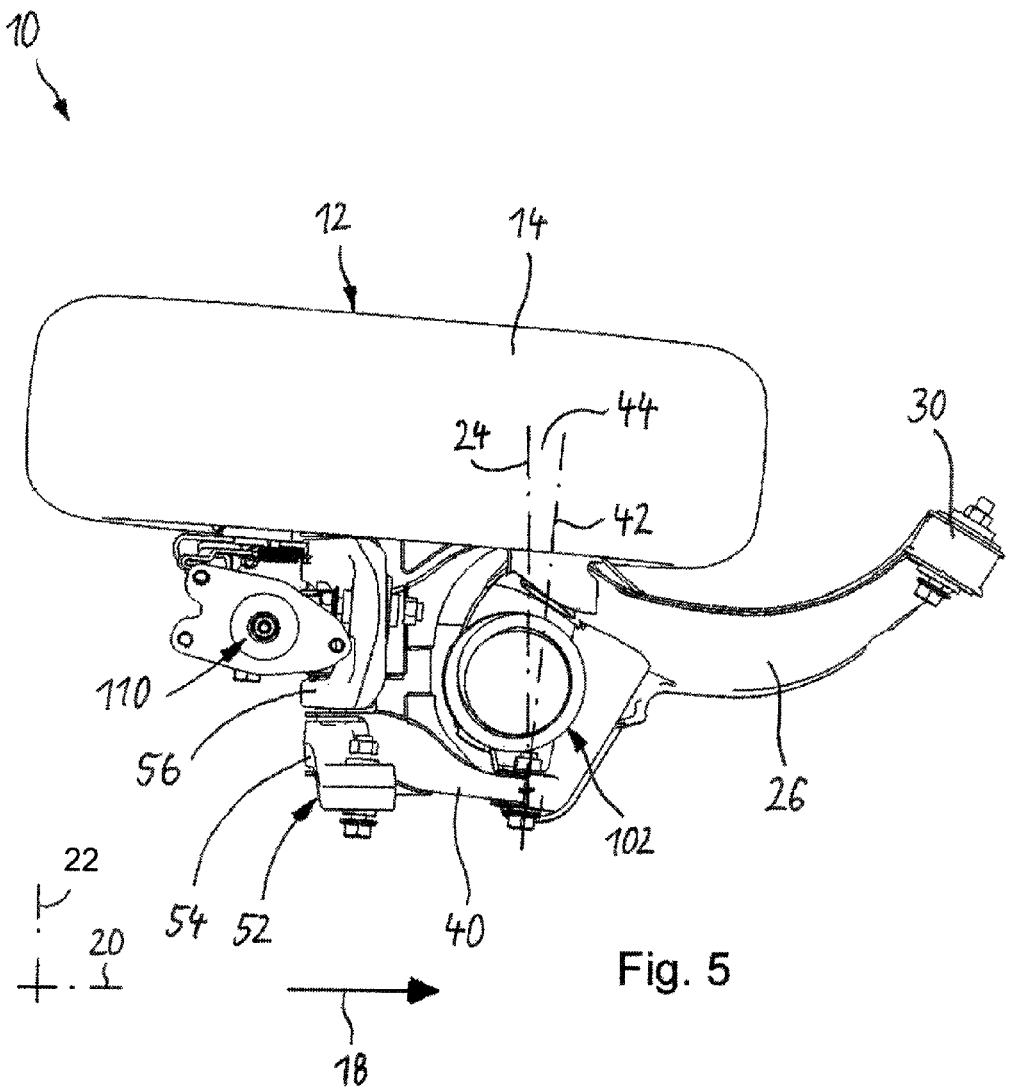
FIG. 5 is a top view of the independent suspension in accordance with FIG. 1.
Figure 6:
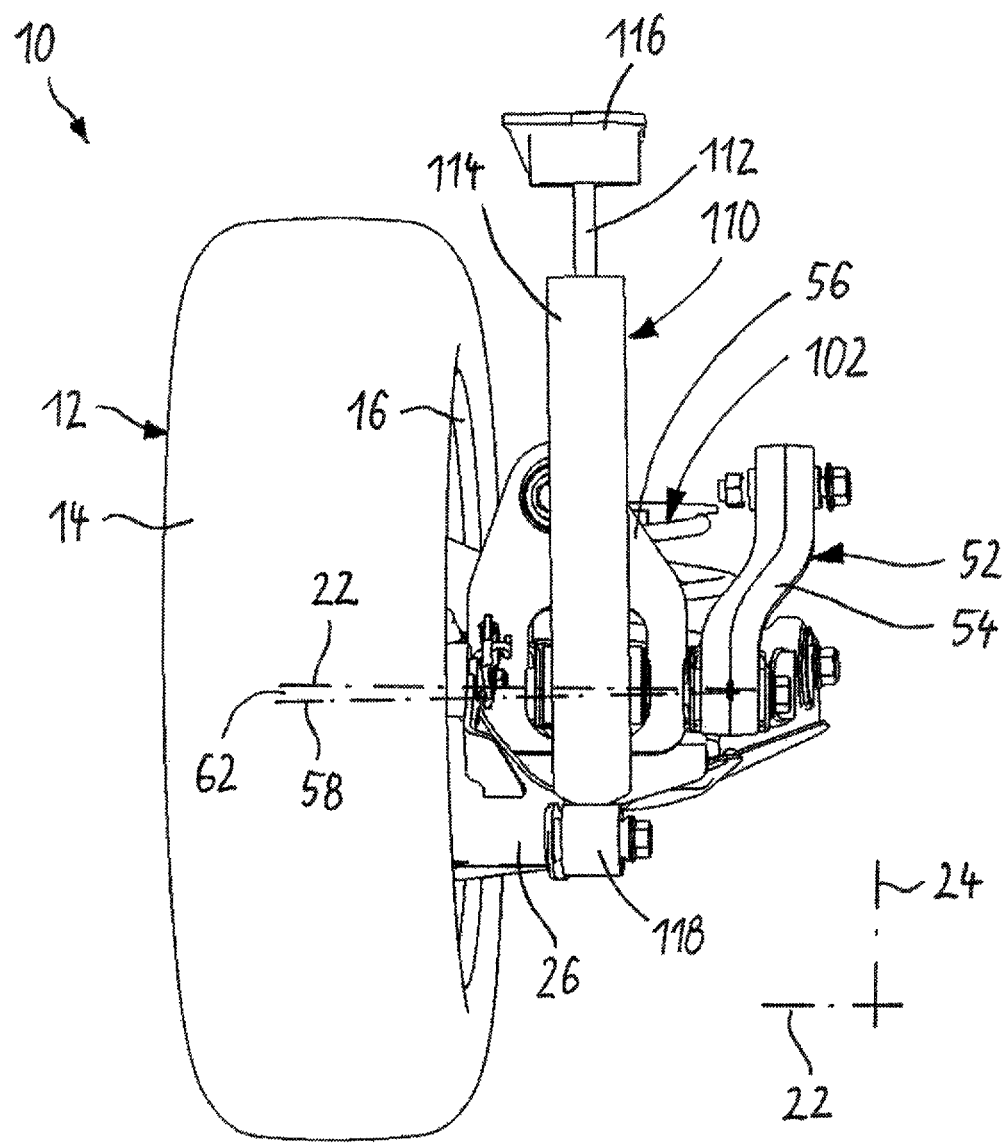
FIG. 6 is a rear view of the independent suspension in accordance with FIG. 1.
Figure 7:
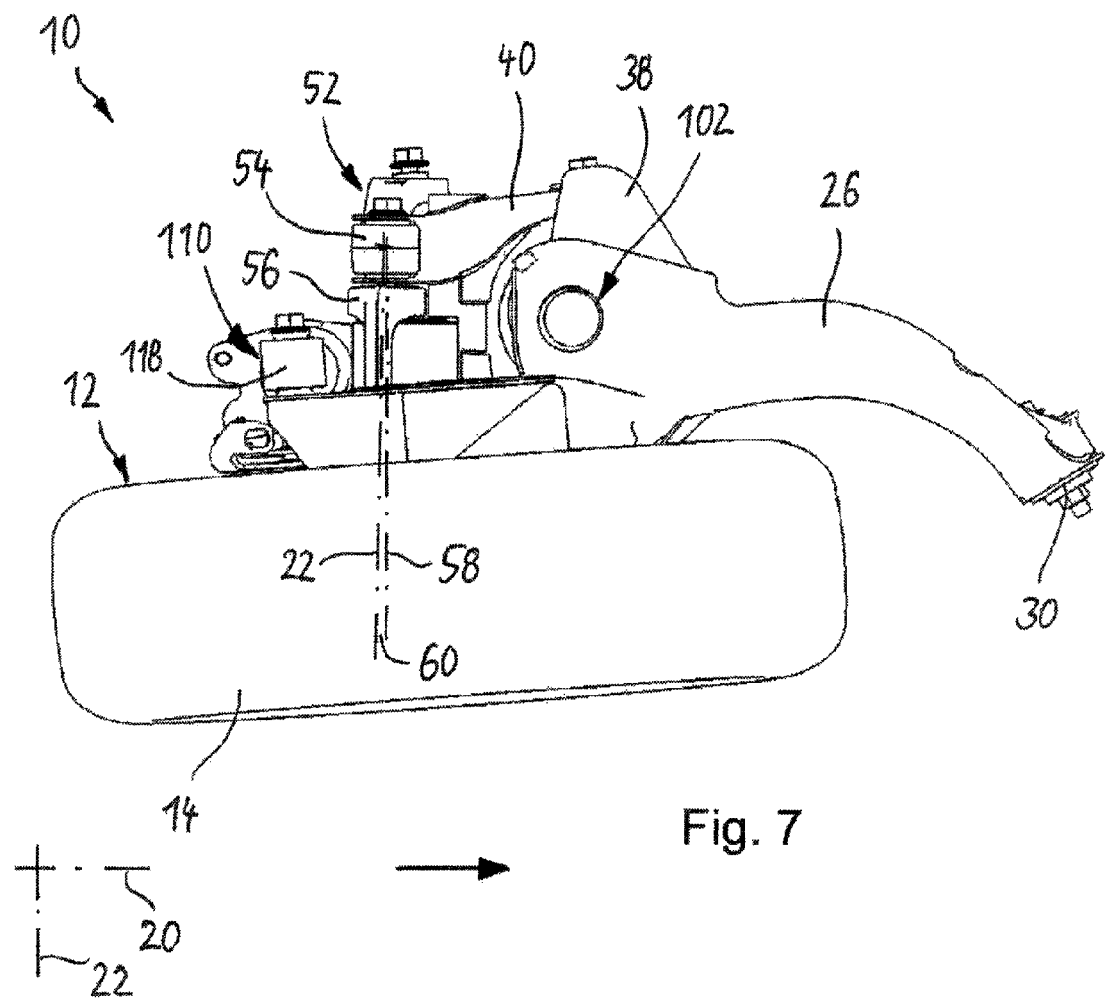
FIG. 7 is a view of the independent suspension in accordance with FIG. 1, from below.
Figure 12:
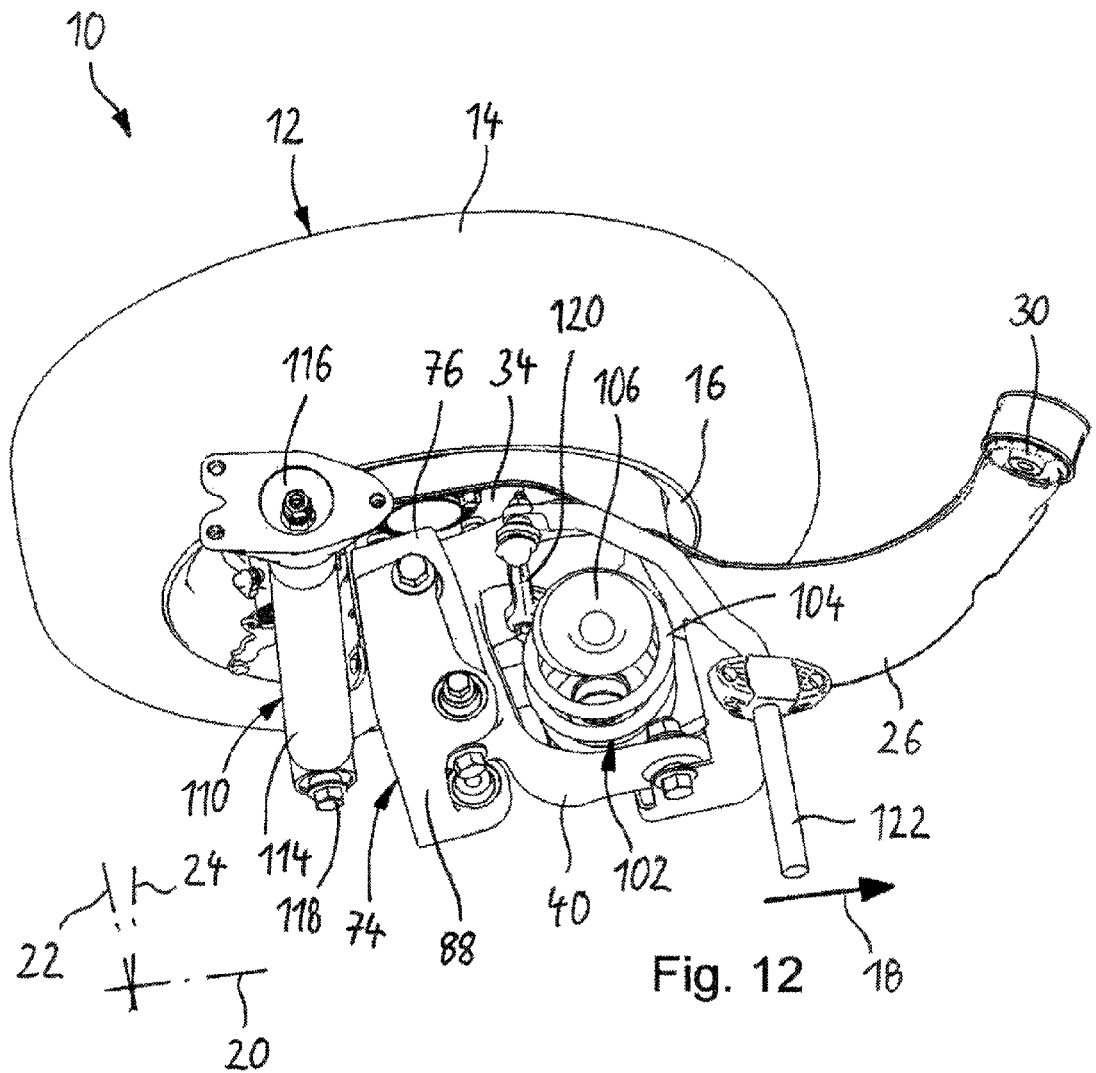
FIG. 12 is a first perspective elevation view of a second inventive independent suspension.
Figure 13:
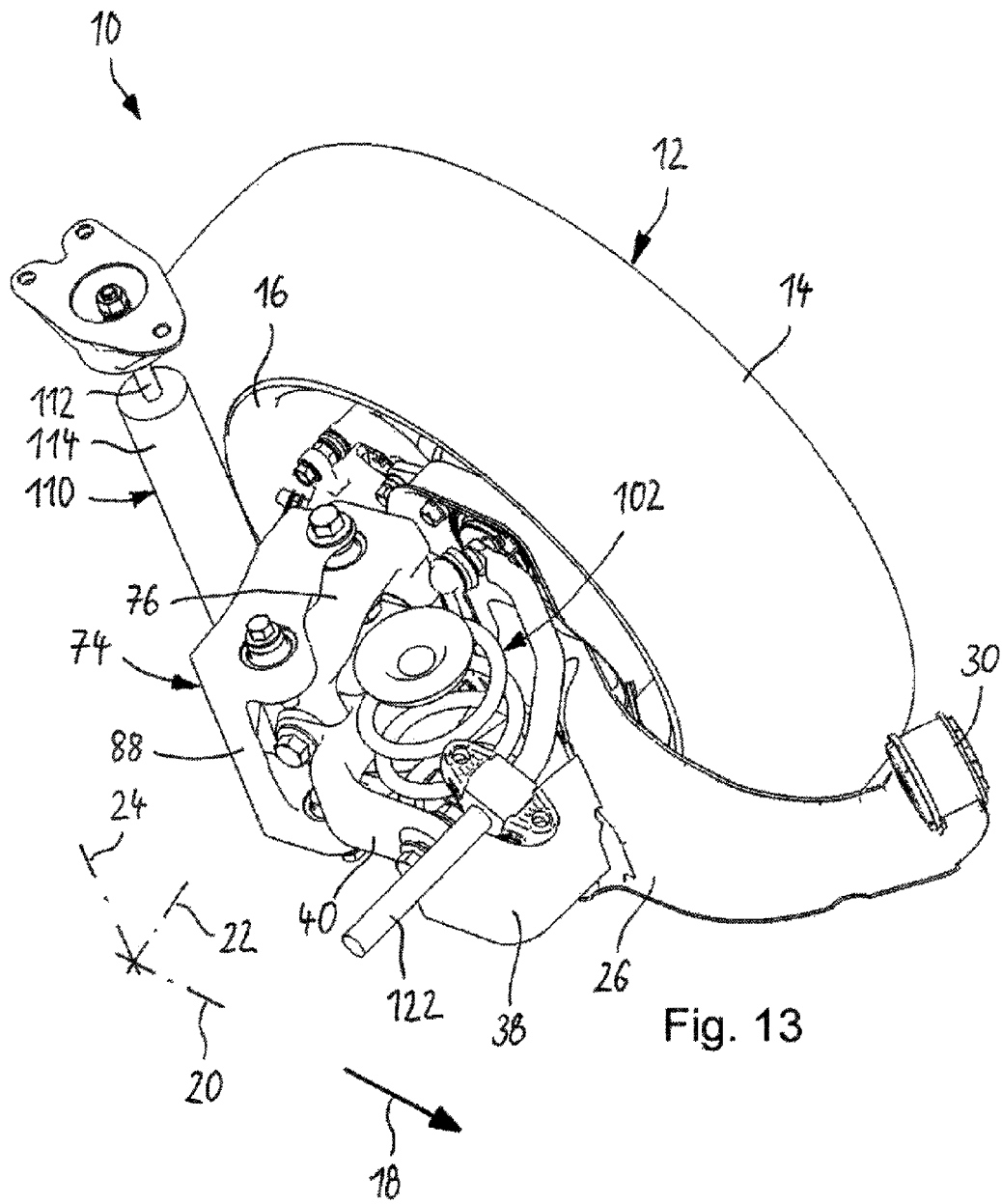
FIG. 13 is a second perspective elevation view of the independent suspension in accordance with FIG. 12.
Figure 15:
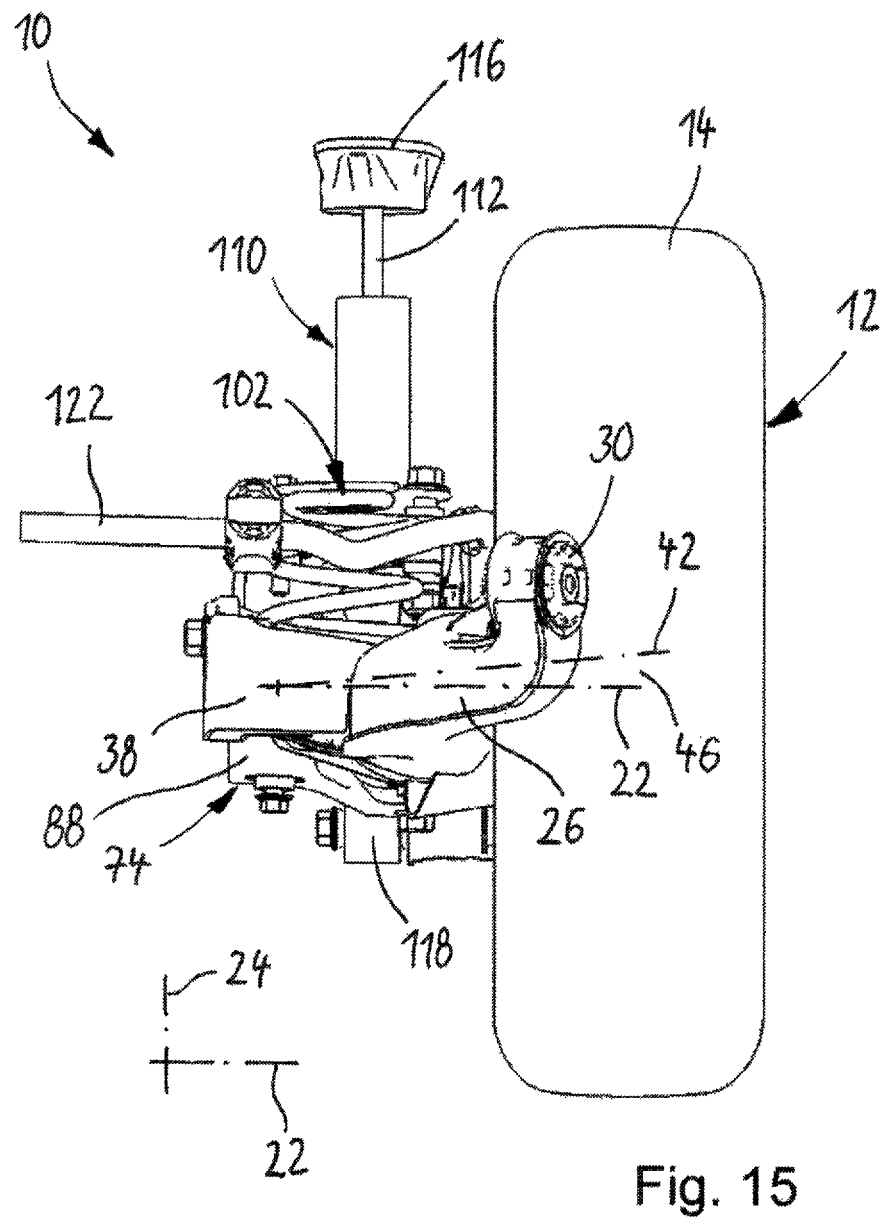
FIG. 15 is a front view of the independent suspension in accordance with FIG. 12.
Figure 16:
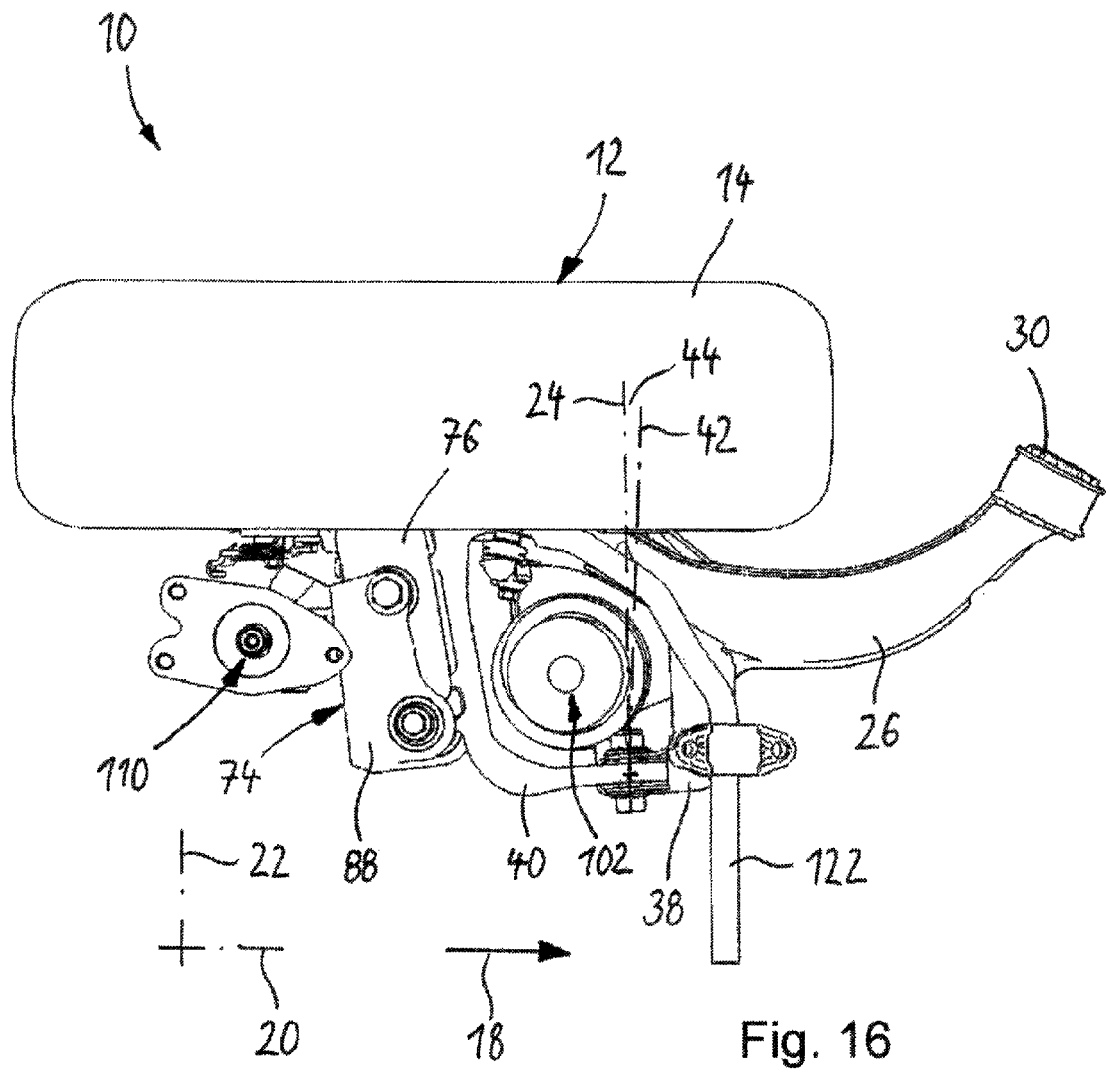
FIG. 16 is a top view of the independent suspension in accordance with FIG. 12.
Figure 17:
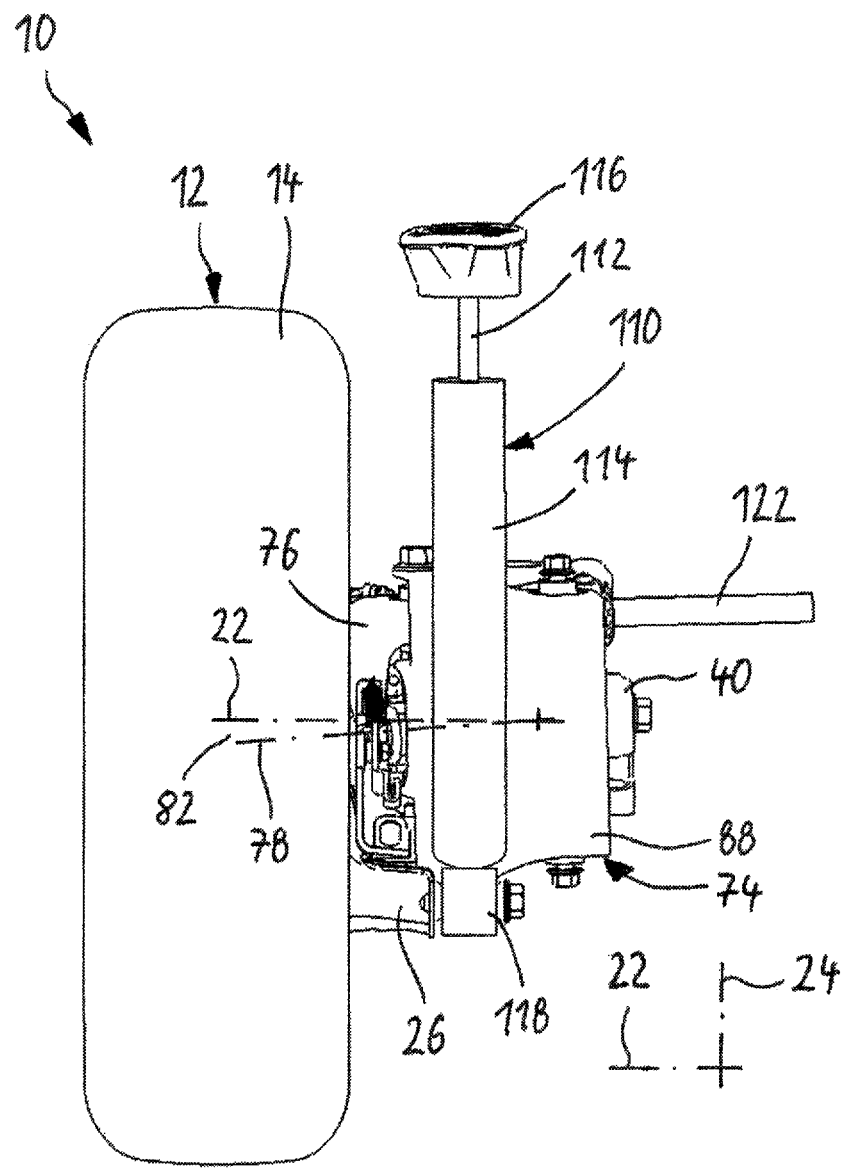
FIG. 17 is a rear view of the independent suspension in accordance with FIG. 12.
Figure 18:
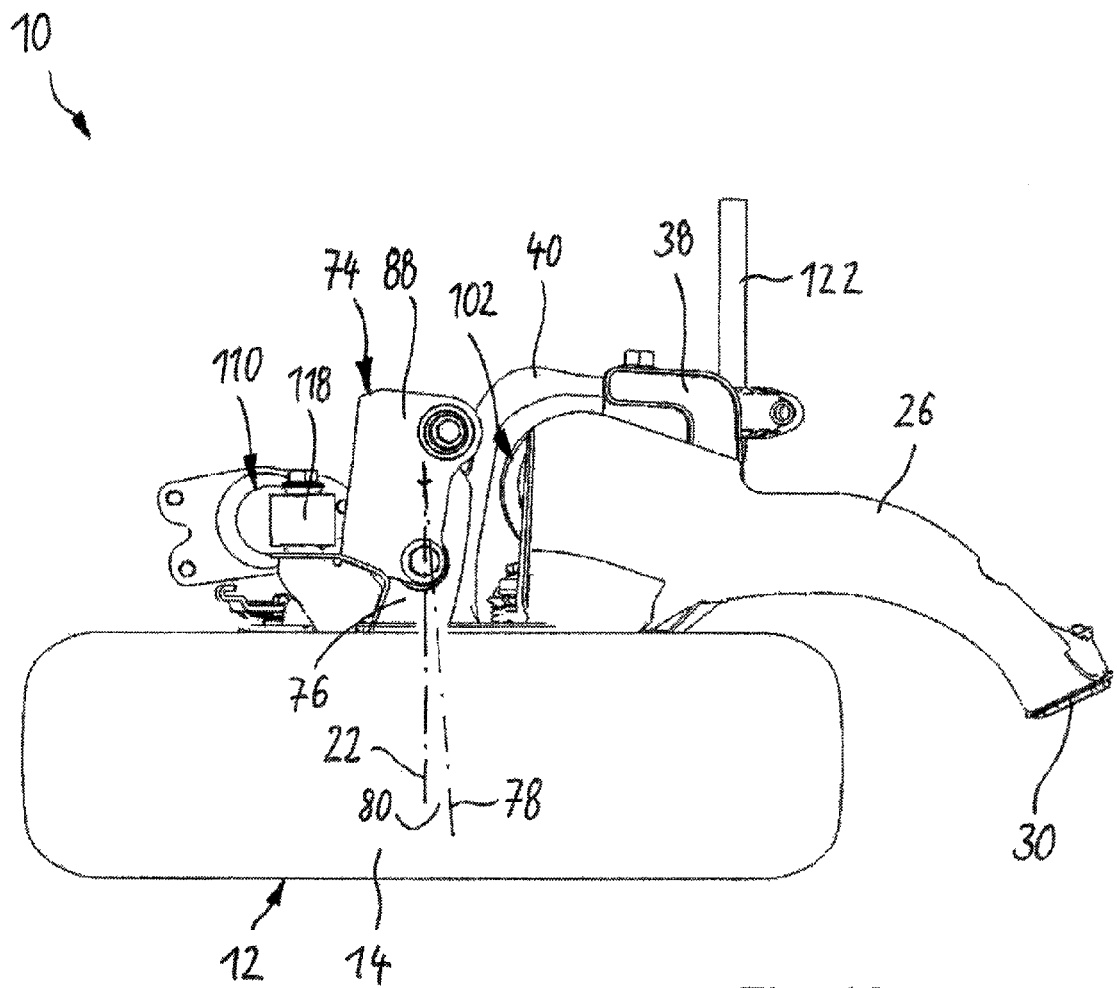
FIG. 18 is a view of the independent suspension in accordance with FIG. 12, from below.
Figure 18:
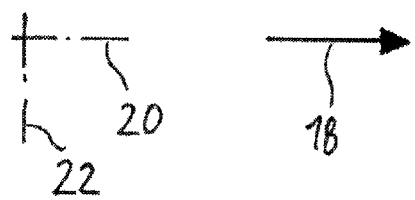

A scissors-type arm 40 is hinged to the side arm 38 (see especially FIGS. 9 and 20) by way of a pivot axis 42. The pivot axis 42 extends at an angle 44 (see FIGS. 5 and 16) of −3° to the vehicle transverse axis 22 in the plane formed by the vehicle longitudinal axis 20 and the vehicle transverse axis 22. Furthermore, the pivot axis 42 extends at an angle 46 (see FIGS. 4 and 15) of +1° to the vehicle transverse axis 22 in the plane formed by the vehicle vertical axis 24 and the vehicle transverse axis 22. The pivot axis 42 is formed with a first pivot point 48 of the scissors-type arm 40, which is embodied as an axle bearing directly on the primary arm of the trailing arm 26. In addition, the pivot axis 42 is defined with a second pivot point 50 that is also formed as an axle bearing at the end area of the side arm 38.

Figure 3:
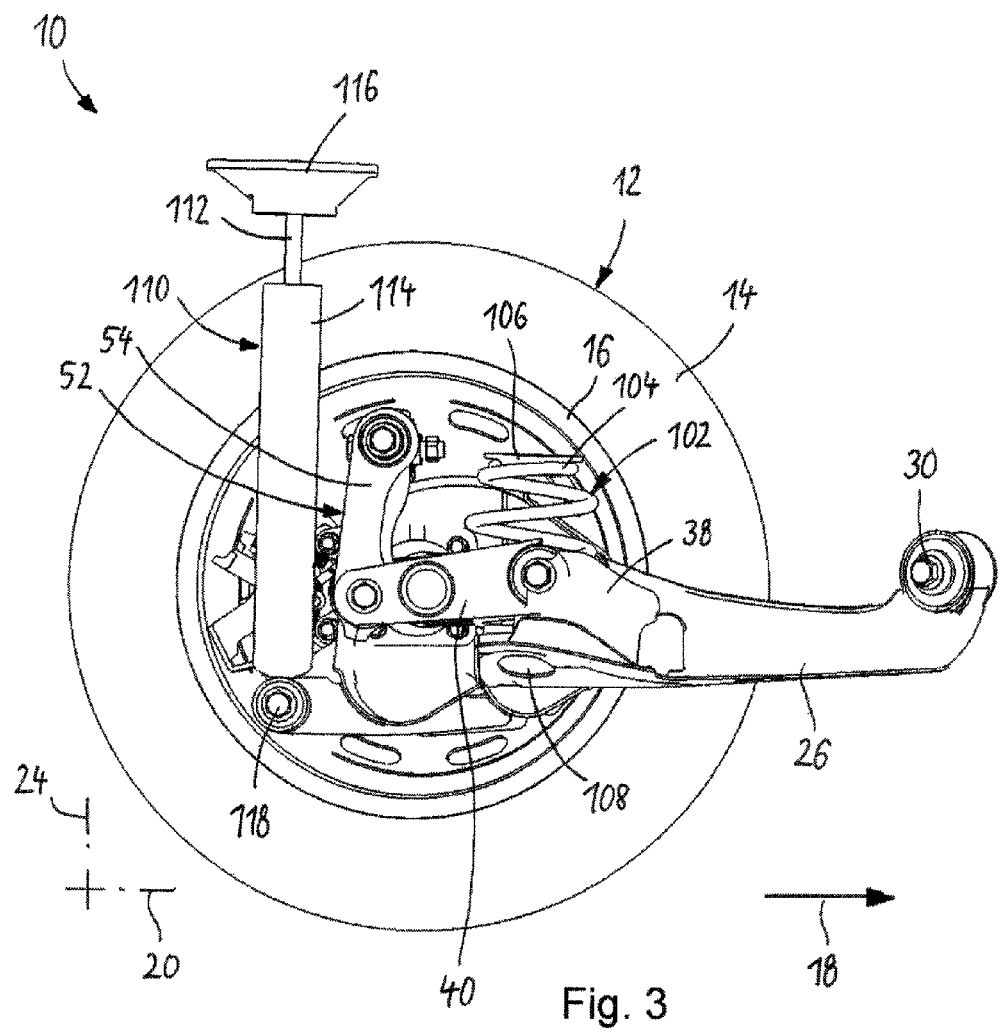
FIG. 3 is a side view of the independent suspension in accordance with FIG. 1, from inside.
Figure 14:
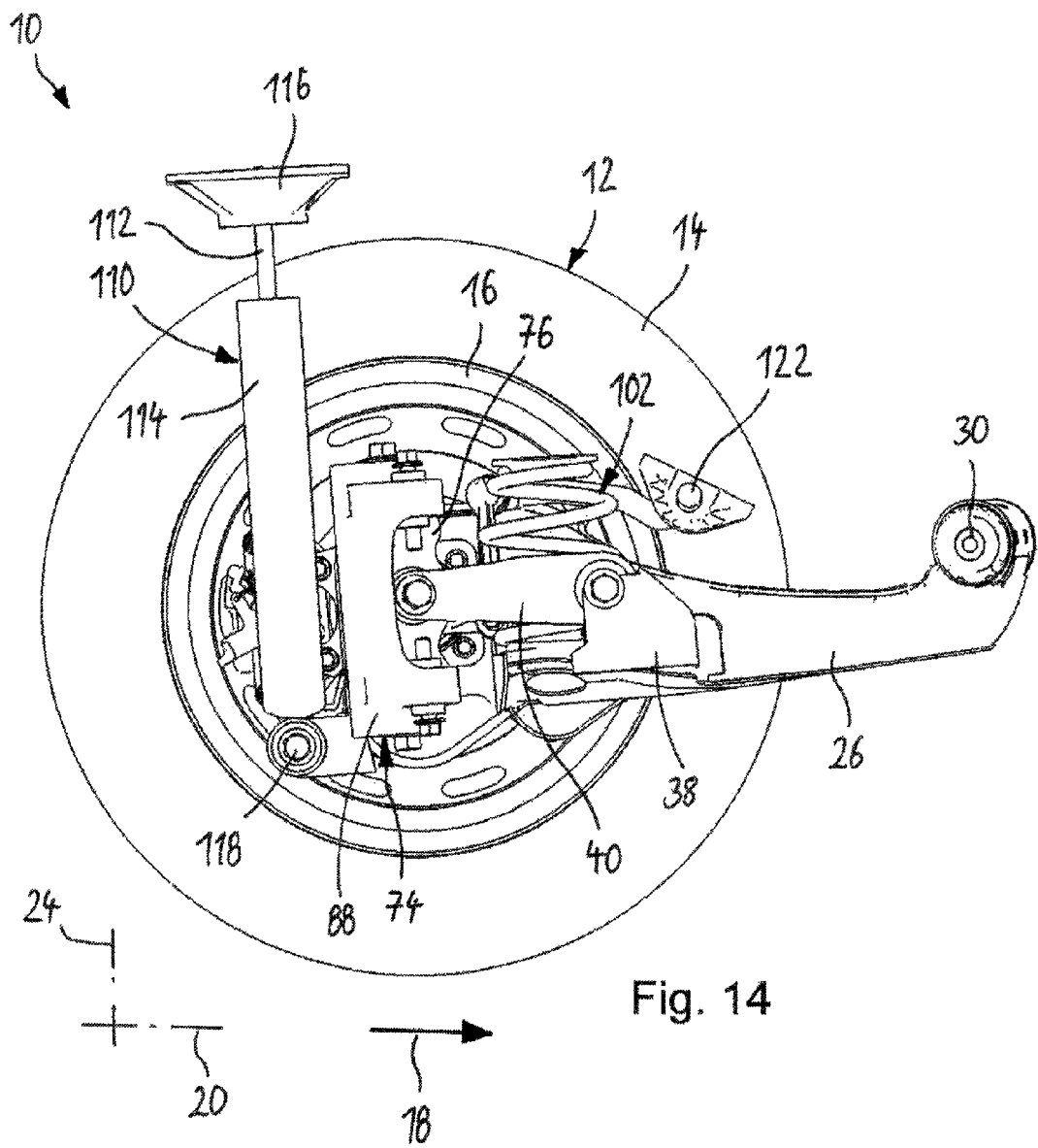
FIG. 14 is a side view of the independent suspension in accordance with FIG. 12, from the inside.

The scissors-type arm 40 hinged in this manner to the trailing arm 26 is slightly mobile in the direction of the vehicle longitudinal axis 20 on the vehicle body and nevertheless is guidingly hinged to the trailing arm 26 in the direction of the vehicle transverse axis 22 and of the vehicle vertical axis 24. At the same time, the scissors-type arm 40 is hinged such that in a lateral projection (that is, a projection in the direction of the vehicle transverse axis 22, see especially FIGS. 3 and 14) it is hinged to the trailer arm 26 inside the rim 16. The scissors-type arm 40 is furthermore itself designed such that it is arranged overall inside the rim 16 in the lateral projection.

In this manner a particularly compact design is created that, in particular, makes it possible to provide a very small wheel envelope on the associated vehicle structure. Moreover, this design and hinging of the scissors-type arm 40 results in advantageous wheel guidance, in particular since the front end area 28 of the trailing arm 26 in its primary travel direction 18 is hinged to the vehicle body and from there may pivot out like a swingarm in the direction of the vehicle vertical axis 24. This pivot movement is guided by the scissors-type arm 40, which is both very small and compact in design. Thus the space available in the center of the wheel 12 is put to optimum use. The compact design also results in short lever lengths, which lead to the effects of transverse forces being particularly low.

So that the scissors-type arm 40 is mounted in a slightly moveable manner in the direction of the vehicle longitudinal axis 20, provided for the independent suspension 10 in accordance with FIGS. 1 through 11 is a pendulum support 52 that connects the scissors-type arm 40 to the associated vehicle body. At its rear end the scissors-type arm 40 is held in the vertical direction with the pendulum support 52. The scissors-type arm 40 may both pivot about the vehicle transverse axis 22 and be displaced in the direction of the vehicle longitudinal axis 20 to compensate the offset it experiences when the trailing arm 26 moves. The scissors-type arm 40 and thus the trailing arm 26 are both guided in the direction of the vehicle transverse axis 22 with the pendulum support 52. The trailing arm 26 thus may not rotate about its longitudinal axis, which it would otherwise do due to the forces acting on it (weight of the vehicle and contact force of the wheel 12).

The pendulum support 52 is designed with a pendulum brace 54 (see FIG. 10) and a track link 56 (see FIG. 11) that are pivotably hinged to a pivot axis 58 on the scissors-type arm 40. The pivot axis 58 extends at an angle 60 (see FIG. 7) of −3.5° to the vehicle transverse axis 22 in the plane formed by the vehicle longitudinal axis 20 and the vehicle transverse axis 22. Furthermore, the pivot axis 58 extends at an angle 62 (see also FIG. 6) of −2° to the vehicle transverse axis 22 in the plane formed by the vehicle vertical axis 24 and the vehicle transverse axis 22. The pendulum brace 54 is hinged to the scissors-type arm 40 with a first pivot point 64 designed as an elastomer bearing and to the vehicle body with a second pivot point 66 that is also designed as an elastomer bearing. The track link 56 is essentially configured as a triangle and is hinged to the scissors-type arm 40 with a first lower pivot point 68 that is designed as an axle bearing and with a second lower pivot point 70 that is also designed as an axle bearing. A third pivot point 72 designed as an elastomer bearing is provided in order to pivotably hinge the upper area of the track link 56 to the vehicle body.

FIGS. 12 through 22 depict an independent suspension 10 in which the slight mobility of the scissors-type arm 40 in the direction of the vehicle longitudinal axis 20 is created with a cardanic support 74 hinged to the vehicle body. The cardanic support 74 supports both the torque of the trailing arm 26 about the vehicle longitudinal axis 20 that the trailing arm 26 experiences due to the forces acting on it and guides the trailing arm 26 in the direction of the vehicle transverse axis 22.

The cardanic support 74 is designed with a cardanic ring 76 that is hinged with a pivot axis 78 to the associated scissors-type arm 40. The pivot axis 78 extends at an angle 80 (see FIG. 18) of −3.5° to the vehicle transverse axis 22 in the plane formed by the vehicle longitudinal axis 20 and the vehicle transverse axis 22. Furthermore, the pivot axis 78 extends at an angle 82 (see FIG. 17) of −2° to the vehicle transverse axis 22 in the plane formed by the vehicle vertical axis 24 and the vehicle transverse axis 22. Provided on one side of the cardanic ring 76 is a first pivot point 84 that is designed as an axle bearing and opposing this is a second pivot point 86, also designed as an axle bearing. For supporting the cardanic ring 76 relative to the vehicle body, a cardanic brace 88 is provided that extends essentially in the shape of a rectangular plate in the plane formed by the vehicle vertical axis 24 and the vehicle transverse axis 22. The cardanic brace 88 is hinged by way of a pivot axis 90 to the cardanic ring 76, which extends essentially in the direction of the vehicle vertical axis 24 and thus essentially at a right angle to the pivot axis 78. The cardanic brace 88 has a first pivot point 92 and a second pivot point 94.

The cardanic brace 88 is pivotably hinged to the vehicle body with a pivot axis 96 that likewise essentially extends in the direction of the vehicle vertical axis 24 and is formed by a third pivot point 98 and a fourth pivot point 100. The pivot points 98 and 100 are each designed as elastomer bearings.

The pendulum support 52 in accordance with FIGS. 1 through 11 and the cardanic brace in accordance with FIGS. 12 through 22 are both arranged overall inside the associated rim 16 in its lateral projection. In this manner a very compact construction is created that nevertheless permits precise guidance and simultaneously sufficient excursion of the trailing arm 26.

Furthermore provided on each of the depicted independent suspensions 10 is a spring element 102 that is formed with a coil spring 104. The spring element 102 is arranged on the associated trailing arm 26 in the area of the hinging of the scissors-type arm 40 as seen in the direction of the vehicle longitudinal axis 20, that is, in the center area 36 or at the height of the lateral arm 38 of the trailing arm 26. With this design, the construction of the individual suspension 10 is kept especially compact and the trailing arm 26 is especially advantageously centrally supported so that the bending forces are minor. The coil spring 104 may be dimensioned such that the spring element 102 is arranged very compactly overall inside the rim 16 in the lateral projection (see FIGS. 3 and 14).

For damping the spring movement of the trailing arm 26, provided on each of the depicted independent suspensions 10 is a damper (shock absorber) 110 that is formed with a damper piston 112 and a damper cylinder 114. The damper piston 112 is displaceably mounted in the damper cylinder 114 and is hinged to the vehicle body by means of an upper element 116, while the damper cylinder 114 is hinged to the rearmost end area of the trailing arm 26 with a lower element 118. The damper 110 is thus disposed in a particularly advantageous manner for the stroke path of the damper piston 112 in the area behind the scissors-type arm 40 as seen in the direction of the vehicle longitudinal axis.

In closing, it should be noted that a rotational stabilizer 122 may be further hinged by way of a pendulum rod 120 to the trailing arm 26 in accordance with FIGS. 12 through 18 in the area of the hinging of the scissors-type arm 40 and of the spring element 102.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An independent suspension of a wheel having a wheel rim of a two-track vehicle having a vehicle body, the independent suspension comprising:
    a trailing arm having two end areas, one end area being hinged to the vehicle body and the other end area forming a wheel carrier;
    a scissors arm hinged to the trailing arm at a location within a lateral projection of the wheel rim of the wheel, the scissors arm guiding the trailing arm relative to the vehicle body; and
    a spring element supporting the trailing arm relative to the vehicle body, the spring element being arranged on the trailing arm in a region of the hinging of the scissors arm to the trailing arm as viewed in a direction of a vehicle longitudinal axis, wherein
        an entirety of the scissors arm is arranged within the lateral projection of the wheel rim.

2. The independent suspension according to claim 1, wherein an entirety of the spring element is arranged within the lateral projection of the wheel rim.

3. The independent suspension according to claim 2, further comprising:
    a damper supporting the trailing arm relative to the vehicle body, the damper being arranged on the trailing arm in an area behind the scissors arm when viewed in the direction of the vehicle longitudinal axis.

4. The independent suspension according to claim 1, further comprising:
    a damper supporting the trailing arm relative to the vehicle body, the damper being arranged on the trailing arm in an area behind the scissors arm when viewed in the direction of the vehicle longitudinal axis.

5. The independent suspension according to claim 3, further comprising:
    a pendulum support hinged to the vehicle body, the pendulum support allowing for a slight movability of the scissors arm in the direction of the vehicle longitudinal axis and a guiding of the trailing arm in the direction of a vehicle transverse axis.

6. The independent suspension according to claim 1, further comprising:
    a pendulum support hinged to the vehicle body, the pendulum support allowing for a slight movability of the scissors arm in the direction of the vehicle longitudinal axis and a guiding of the trailing arm in the direction of a vehicle transverse axis.

7. The independent suspension according to claim 3, further comprising:
a cardanic support hinged to the vehicle body, the cardanic support allowing a slight movability of the scissors arm in the direction of the vehicle longitudinal axis and a guiding of the trailing arm in the direction of a vehicle transverse axis.

8. The independent suspension according to claim 1, further comprising:
a cardanic support hinged to the vehicle body, the cardanic support allowing a slight movability of the scissors arm in the direction of the vehicle longitudinal axis and a guiding of the trailing arm in the direction of a vehicle transverse axis.

9. The independent suspension according to claim 5, wherein an entirety of the pendulum support is arranged within the lateral projection of the wheel rim.

10. The independent suspension according to claim 7, wherein an entirety of the cardanic support is arranged within the lateral projection of the wheel rim.

11. The independent suspension according to claim 1, wherein
the scissors arm is hinged to a pivot axis on the trailing arm extending essentially in a direction of the vehicle transverse axis for guiding the trailing arm in the direction of the vehicle vertical axis.

12. The independent suspension according to claim 11, further comprising:
an elastomer bearing providing the hinging of the trailing arm at the one end area to the vehicle body, the elastomer bearing being configured to permit an elastokinematic relative movement.

13. The independent suspension according to claim 1, further comprising:
an elastomer bearing providing the hinging of the trailing arm at the one end area to the vehicle body, the elastomer bearing being configured to permit an elastokinematic relative movement.

14. An independent suspension of a wheel having a wheel rim of a two-track vehicle having a vehicle body, the independent suspension comprising:
a trailing arm having two end areas, one end area being hinged to the vehicle body and the other end area supporting a wheel carrier;
a scissors arm hinged to the trailing arm at a location within a lateral projection of the wheel rim of the wheel, the scissors arm guiding the trailing arm relative to the vehicle body;
a spring element supporting the trailing arm relative to the vehicle body, the spring element being arranged on the trailing arm in a region of the hinging of the scissors arm to the trailing arm as viewed in a direction of a vehicle longitudinal axis; and
a damper supporting the trailing arm relative to the vehicle body, the damper being arranged on the trailing arm in an area behind the scissors arm when viewed in the direction of the vehicle longitudinal axis.

15. An independent suspension of a wheel having a wheel rim of a two-track vehicle having a vehicle body, the independent suspension comprising:
a trailing arm having two end areas, one end area being hinged to the vehicle body and the other end area supporting a wheel carrier;
a scissors arm hinged to the trailing arm at a location within a lateral projection of the wheel rim of the wheel, the scissors arm guiding the trailing arm relative to the vehicle body;
a spring element supporting the trailing arm relative to the vehicle body, the spring element being arranged on the trailing arm in a region of the hinging of the scissors arm to the trailing arm as viewed in a direction of a vehicle longitudinal axis; and
a pendulum support hinged to the vehicle body, the pendulum support allowing for a slight movability of the scissors arm in the direction of the vehicle longitudinal axis and a guiding of the trailing arm in the direction of a vehicle transverse axis.

\* \* \* \* \*